United States Patent [19]

Ramsbro

[11] Patent Number: 4,799,841
[45] Date of Patent: Jan. 24, 1989

[54] DOWEL-LIKE APPARATUS FOR LOCATING A COMPONENT ON A REFERENCE PART

[75] Inventor: Börje Ramsbro, Djursholm, Sweden

[73] Assignee: System 3R International ab, Vällingby, Sweden

[21] Appl. No.: 13,042

[22] Filed: Feb. 10, 1987

[30] Foreign Application Priority Data

Feb. 11, 1986 [SE] Sweden .................. 8600599

[51] Int. Cl.⁴ .................. F16B 13/06
[52] U.S. Cl. .................. 411/55; 411/50; 411/60; 411/271
[58] Field of Search .................. 411/50, 51, 54, 55, 411/57, 60, 389, 271

[56] References Cited

U.S. PATENT DOCUMENTS

| | | | |
|---|---|---|---|
| 2,071,363 | 2/1937 | Shannon | 411/54 |
| 2,397,545 | 4/1946 | Hardinge | 411/54 |
| 2,998,110 | 8/1961 | Hutzelman | 411/55 |
| 3,042,094 | 7/1962 | Liljeberg | 411/389 |
| 3,884,099 | 5/1925 | Sikstrom | 411/51 |
| 4,516,378 | 5/1985 | Fischer | 411/55 |

FOREIGN PATENT DOCUMENTS

| | | |
|---|---|---|
| 0089298 | 3/1983 | European Pat. Off. . |
| 1502047 | 12/1963 | Fed. Rep. of Germany . |
| 2451832 | 10/1974 | Fed. Rep. of Germany . |
| 3146005 | 11/1981 | Fed. Rep. of Germany . |
| 907671 | 11/1944 | France . |
| 1490496 | 6/1967 | France .................. 411/55 |
| 444623 | 3/1936 | United Kingdom .................. 411/55 |

Primary Examiner—Neill R. Wilson
Attorney, Agent, or Firm—Fleit, Jacobson, Cohn & Price

[57] ABSTRACT

A dowel-like device is described for locating a component (1) having a through-bore (33) relative to a reference part (2) provided with a bore (34), the through-bore and the bore having the same inside width. In order for the dowel to permit an accurate, repeatable positioning of the component on the reference part without loss of precision, it is provided with a cylindrical bushing (3), which is elastic in a radial direction at least over part of its length and is internally conical. A rotatable bolt (9) extending axially into the conical bushing section (4) is locked against movement in the axial direction and cooperates with a cone member (7) which extends into the conical bushing section, so that upon rotation of the bolt, the cone member moves axially, causing its exterior surface to push outwardly against the bushing. This expands the bushing into firm contact with the wall of the bores in the component and the reference part.

13 Claims, 1 Drawing Sheet

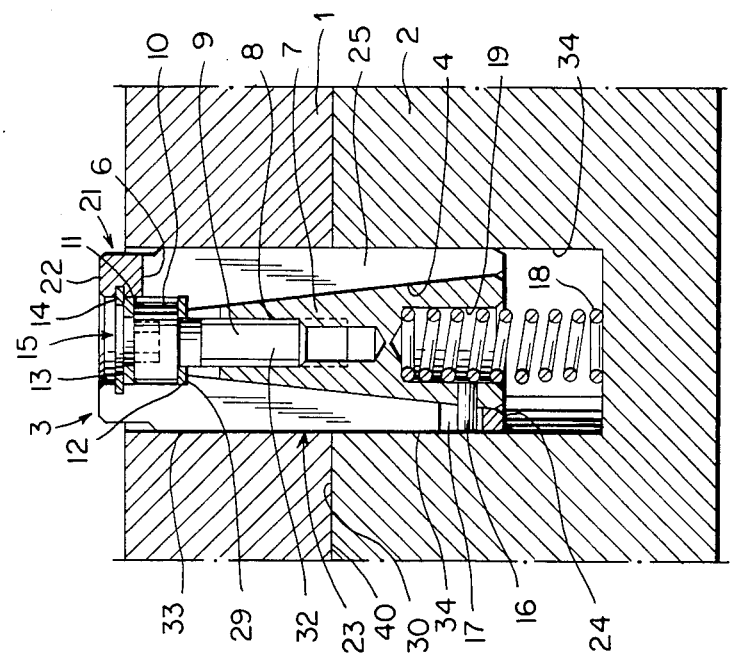
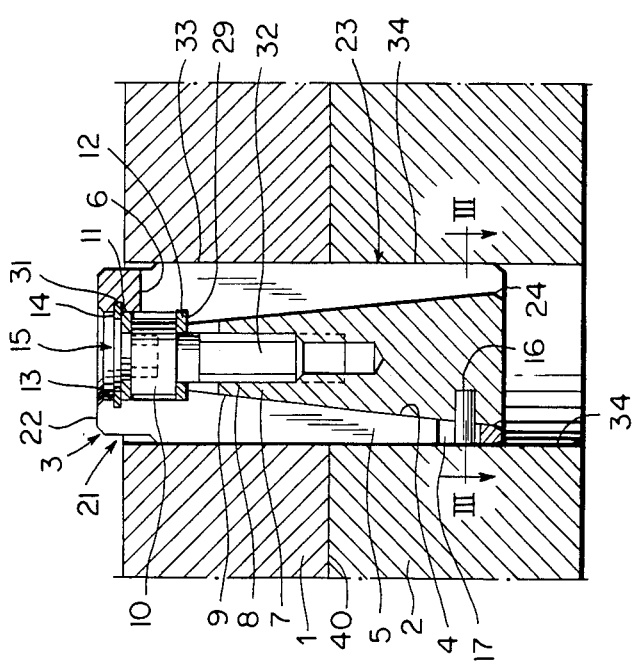
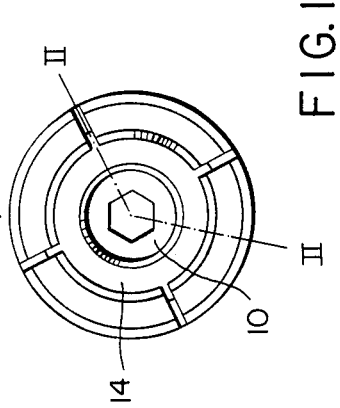
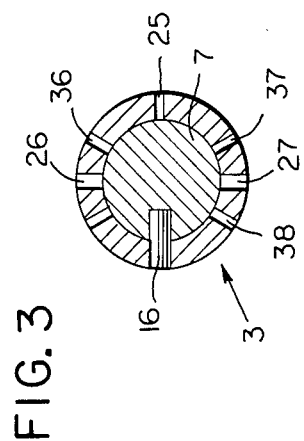

DOWEL-LIKE APPARATUS FOR LOCATING A COMPONENT ON A REFERENCE PART

BACKGROUND AND FIELD OF THE INVENTION

The invention relates to a dowel-type device for precisely positioning a component having a through-bore relative to a reference part which also has a bore of the same inside width as the through-bore.

French Pat. No. 907,671 teaches an expanding dowel for attaching a component to a wall, in which the dowel is inserted into a blind hole in the wall and a bolt extending through a through-bore in the component engages in an expanding cone, which, by turning the bolt, presses the sides of the expanding dowel against the inside wall of the blind hole.

In order to fix a component exactly on a reference part, a high degree of accuracy is necessary. This is so especially when a workpiece is to be subjected to electric discharge machining and the permissible deviation of the actual position of the workpiece from its nominal expected position relative to the reference part should not be allowed to exceed a distance on the order of a few microns. Nevertheless, the fixing in position of the component on the reference part must be repeatable as often as necessary without loss of precision. The component itself may be a workpiece to be machined or even part of a workpiece holder. The reference part may, for example, be a work table.

The expanding dowel known from civil engineering and building construction is unsuitable for locating with the necessary repeatability and precision.

BRIEF DESCRIPTION OF THE INVENTION

Therefore, a major object of the invention is to provide a dowel-like device for the exact and, without loss of precision, repeatable locating of a component provided with a through-bore on a reference part which also has a bore.

For this purpose, according to the invention there is provided a cylindrical bushing, which is radially elastic at least over part of its length and has an internal opening which is conical. A cone-shaped part fits within the conical opening in the bushing for movement axially thereof, the dimensions of the cone-shaped part and the conical opening being such that, as the cone-shaped part is moved axially within the opening in one direction, the outer surface of the cone-shaped part presses outwardly on the bushing to expand it radially. A bolt is rotatably held in the bushing and has a threaded portion which extends axially within the conical opening for cooperation with a threaded bore in the cone-shaped part. An externally accessible head on the bolt may be turned to rotate the bolt and cause axial movement of the cone-shaped part relative to the bushing to cause expansion or contraction of the bushing.

When the outside diameter of at least the elastic and internally conical bushing section is equal to the inside width of the through-bore as well as of the bore in the reference part, this bushing section can axially align both bores and by turning the bolt can anchor the bushing in both bores by force fit. This anchoring can be loosened at any time by turning the bolt in the reverse direction, so that the positioning can be repeated without loss of precision.

In a preferred embodiment of the invention, the expanding cone is locked in the conical bushing section to prevent turning by profiling its taper or by a radial pin engaged in the bushing shell, by means of which the loosening of the bushing from engagement with the bores is facilitated.

For practical reasons, the head of the bolt is held in a cylindrical bore of the bushing head formed axially outside the elastic and conical bushing section, the head being advantageously propped axially outwards and/or axially inwards against a lock washer or support ring held in an annular groove of the bushing.

BRIEF DESCRIPTION OF THE DRAWINGS

The invention will be described in detail in the following section with reference to embodiments illustrated in the accompanying drawing.

FIG. 1 is a top plan view of the bushing with bolt head.

FIG. 2 is an axial section through the bushing inserted in the bores along the line II—II of FIG. 1.

FIG. 3 is a cross-sectional view taken along the line III—III of FIG. 2.

FIG. 4 is a diagram similar to FIG. 2 of another practical embodiment.

DETAILED DESCRIPTION OF PREFERRED EMBODIMENTS

The bushing generally labeled 3 has a shell 23 with a cylindrical outside surface, and a bushing head 21 having a slightly smaller diameter than the shell 23. Cut into the shell 23, spaced an equal distance along the circumference, are four first slots 5, 25, 26, 27 which, starting from the bushing head 21, extend almost over the entire length of the bushing and end shortly before the face 24 of the bushing 3 away from the bushing head 21. Cut into the shell 23, spaced an equal distance along the circumference and starting from the face 24, are four second slots 35, 36, 37, 38, which end in the bushing head spaced a distance from its face 22 at 6 and lie midway between the first slots 5, 25, 26, 27. By virtue of the first and second slots, at least the shell 23 of the bushing 3 made of tool steel is elastic in the radial direction.

Essentially over the entire length of the shell 23, the bushing 3 has a conical axial internal bore 4, which flares toward face 24. Extending into bushing head 21, starting from the front face 22 of the bushing head 21, is a cylindrical bore 15, which goes over into the conical bore 4 via an annular shoulder 29 projecting radially inwards. Cut into the inner wall 13 of the bore, close to the face 22, is an annular groove 13 in which a radially resilient lock ring 14 is held.

Engaged in the cylindrical bore 15, between the annular shoulder 29 and the lock ring 14, is the head 10 of a bolt, the head 10 being supported by a first support ring 12 resting on the annular shoulder 29 and a second support ring is interposed between the opposite, exposed face of the head 10 and the lock ring 14. The head 10 has a hexagonal recess, in which the hexagonal end of a screwdriver (not shown) can engage from outside.

The externally threaded bolt shaft 32, starting from head 10, extends centrally into the conical bore 4 and engages threreat in the internal thread of a blind hole 8 of an expanding cone 7, the conical outer wall of which abuts against the inner wall of the conical bore 4.

In the expanding cone 7, close to the end thereof facing away from the central blind hole 8, a pin projecting radially therefrom is held in force fit, said pin extending into an axial longitudinal slot 17 in the shell 23 and not projecting beyond the outside contour thereof.

In the form of construction of the expanding cone 7 shown in FIG. 4, starting from the end thereof opposite the blind hole 8, there is provided as a recess a spring clip 19, in which a pressure spring 18 is held by one end.

As shown in FIGS. 2 and 4, the bushing is used for locating a workpiece 1 with precision on a work table 2, whereby the workpiece 1 has a through-bore 33 and the work table a bore 34. Through-bore 33 and bore 34 have the same inside width, and the outside diameter of the shell 23 corresponds to this inside width. In the practical examplary embodiment shown, the work table 2 has a plane-ground surface 40 and the workpiece 1 an appropriately plane bearing face 30. For locating the workpiece 1, which initially is freely movable relative to the table 2, it is placed on the table 2 in such a way that the through-bore 33 is in alignment with the bore 34. The bushing 3 is then inserted so far into the through-bore 33 and the bore 34 that both the through-bore 33 and the bore 34 are engaged by the shell 23. By means of the aforesaid screwdriver, the bolt 9 is turned in such a way that the expanding cone 7 is drawn into the conical bore 4, the head 10 remaining engaged—locked against substantial moving in axial direction, yet rotatable—in the bore 13 between the support washers 11 and 12. By pulling the expanding cone 7 into the conical bore 4, the shell 23 is widened radially outwards in an elastic manner, so that the bushing 3 is held in force fit in the through-bore 33 and the bore 34, and thereby the workpiece 1 is fixed on table 2 such that its through-bore 34 assumes with precision an exact position in x- and y- directions in the plane of the surface 40.

To loosen its fixing, the bolt 9 is turned in the opposite direction, whereby, due to the locking of the head 10 against substantial movement in axial direction, the cone 7 is driven out of the conical bore 4 and the shell 23 returns to its relaxed initial position. The bushing can then be removed upwards or downwards from the bores 33, 34, and the workpiece 1 can be removed from the table 2.

The radial pin 16, engaged in the slot 17, facilitates the loosening of the expanding cone 7 from its engagement with the inner wall of the conical bore 4 and facilitates its engagement therewith by preventing the expanding cone 7 from turning together with the bolt 9.

The pressure spring 18 is advantageously used if the table 2 has a blind hole serving as the bore 34, whereby the spring 18 then pushes on the bottom of the blind hole and, after loosening of the force fit, presses the bushing 3 upwards, where it can easily be removed from the through-bore 33.

The invention is not limited to details of the practical embodiment described above. Thus, to prevent the expanding cone 7 from turning, it can be provided at its end facing away from the blind hole 8 with a radial nose, which can engage in one of the second slots or in an appropriately shaped, elongated recess in the inner surface of the conical bore 4. However, the locking of the expanding cone 7 against turning is basically already ensured, because the head 10 cannot move axially and is propped axially inwards against the first support ring 12 and axially outwards against the second support ring 11, which is engaged from behind by the lock ring 14.

This description of the illustrated embodiments of the invention is intended as exemplary. Variations and modifications will be evident to persons skilled in the art, and it is intended that the scope of the invention be ascertained from the following claims.

What is claimed is:

1. Apparatus for locating a component having a through-bore relative to a reference part such that a bore of the reference part having the same inside width as the through-bore is aligned thereto, the apparatus comprising a bushing which has a generally cylindrical exterior outline and is radially elastic at least over a portion of its length beginning from one end thereof, and has an axial passage therethrough which is, adjacent to said one end, radially conically extended and into which, adjacent the opposite end of the bushing, a first annular shoulder and an axially spaced second annular shoulder project radially inwardly for accommodating rotatably a bolt head between said annular shoulders, the bolt being adapted for moving axially a conical member disposed within the conical extension of the passage to expand said radially elastic portion into contact with the walls of said bores, the annular shoulders limiting axial movement of the bolt within the passage.

2. Apparatus according to claim 1, wherein a plurality of first slots spaced about the bushing circumference and starting from one end of the bushing are cut into the exterior of the bushing, and wherein a plurality of second slots spaced about the bushing circumference and starting from said opposite end of the bushing are cut into the exterior of the bushing.

3. Apparatus according to claim 1, wherein said conical member has a blind hole with an internal thread for cooperation with the bolt.

4. Apparatus according to claim 1, wherein said conical member is locked by a profile form on its surface to prevent turning thereof in the conical extension of the passage.

5. Apparatus according to claim 4, wherein said bushing is provided with axial longitudinal slot and wherein a radial pin anchored in said conical member extends into said slot cut into the shell of the bushing.

6. Apparatus according to claim 1, including a spring clip bearing against said conical member to bias it in one axial direction.

7. Apparatus for locating a component having a through-bore relative to a reference part such that a bore of the reference part having the same inside width as the through-bore is aligned thereto, said apparatus comprising:
   a bushing having a generally smooth cylindrical exterior configuration, said bushing being radially elastic at least over a portion of its length beginning from one end thereof,
   an axial passage extending through said bushing,
   a first annular shoulder and an axially spaced second annular shoulder of said bushing projecting radially into said axial passage adjacent on opposite end of said bushing,
   a bolt having a bolt head, said bolt extending axially and centrally in said axial passage, said bolt head being rotatably accommodated in said axial passage between said first annular shoulder and said second annular shoulder, and
   a conical member disposed within said axial passage and engaging said bolt to expand said radially elastic portion into contact with the walls of said bores by axial movement of said conical member when said bolt head is rotated, said first annular shoulder and said second annular shoulder limiting axial movement of the bolt within said axial passage.

8. Apparatus according to claim 7, wherein a plurality of first slots are spaced about the bushing circumference and extend from said one end of the bushing, and a plurality of second slots are spaced about the bushing circumference and extend from said opposite end of the bushing.

9. Apparatus according to claim 7, wherein said conical member has a blind hole with an internal thread for cooperation with said bolt.

10. Apparatus according to claim 7, wherein said conical member is locked by a profile form on its surface to prevent turning thereof in the conical extension of the passage.

11. Apparatus according to claim 10, wherein said bushing includes with an axial longitudinal slot and a radial pin anchored in said conical member extends into said slot.

12. Apparatus according to claim 7, wherein a spring clip bears against said conical member to bias it in one axial direction.

13. Apparatus for locating a component having a through-bore relative to a reference part such that a bore of the reference part having the same inside width as the through-bore is aligned thereto, said apparatus comprising:

a bushing having a generally smooth cylindrical exterior configuration, said bushing being radially elastic at least over a portion of its length beginning from one end thereof, an axial passage extending through said bushing, a first annular shoulder and an axially spaced second annular shoulder of said bushing projecting radially into said axial passage adjacent an opposite end of said bushing, a bolt having a bolt head, said bolt extending axially and centrally in said axial passage, said bolt head being recessed from said opposite end and rotatably accommodated in said axial passage between said first annular shoulder and said second annular shoulder, a conical member disposed within said axial passage and engaging said bolt to expand said radially elastic portion into contact with the walls of said bores by axial movement of said conical member when said bolt head is rotated, said first annular shoulder and said second annular shoulder limiting axial movement of the bolt within said axial passage, and means for removably mounting said bushing in said component and in said reference part.

* * * * *